(12) United States Patent
Kalavsky (10) Patent No.: US 12,212,187 B2
(45) Date of Patent: Jan. 28, 2025

(54) ELECTRIC DRIVE MOTOR, WET-ROTOR PUMP, AND HOUSEHOLD APPLIANCE

(71) Applicant: BSH HAUSGERAETE GMBH, Munich (DE)

(72) Inventor: Michal Kalavsky, Kosice (SK)

(73) Assignee: BSH Hausgeraete GmbH, Munich (DE)

( * ) Notice: Subject to any disclaimer, the term of this patent is extended or adjusted under 35 U.S.C. 154(b) by 145 days.

(21) Appl. No.: 16/954,645

(22) PCT Filed: Nov. 28, 2018

(86) PCT No.: PCT/EP2018/082829
§ 371 (c)(1),
(2) Date: Jun. 17, 2020

(87) PCT Pub. No.: WO2019/120912
PCT Pub. Date: Jun. 27, 2019

(65) Prior Publication Data
US 2020/0313476 A1 Oct. 1, 2020

(30) Foreign Application Priority Data
Dec. 19, 2017 (DE) .......................... 102017223256.0

(51) Int. Cl.
*H02K 1/2733* (2022.01)
*F01P 5/12* (2006.01)
*F04D 13/06* (2006.01)
*H02K 1/27* (2022.01)
(Continued)

(52) U.S. Cl.
CPC ................... *H02K 1/27* (2013.01); *F01P 5/12* (2013.01); *F04D 13/0633* (2013.01);
(Continued)

(58) Field of Classification Search
CPC .. F04D 13/0633; F04D 13/06; F04D 13/0606; H02K 1/27; H02K 1/278;
(Continued)

(56) References Cited

U.S. PATENT DOCUMENTS 9,997,970 B2  6/2018  Ivanak et al.
2002/0158544 A1*  10/2002  Bobay .................. H02K 15/165
310/91

(Continued)

FOREIGN PATENT DOCUMENTS

CN  101255868 A  9/2008
CN  101408179 A  4/2009
(Continued)

OTHER PUBLICATIONS

Machine translation of EP2908407A2. (Year: 2015).*

*Primary Examiner* — Michael Andrews
(74) *Attorney, Agent, or Firm* — Laurence A. Greenberg; Werner H. Stemer; Ralph E. Locher (57) ABSTRACT

An electric drive motor has a permanent magnet rotor with a motor shaft on which a permanent magnet carrier is fastened. A first axial end portion of the motor shaft has a seat for an impeller and the permanent magnet carrier carries at least one permanent magnet at a second axial end portion of the motor shaft. The permanent magnet carrier is pot-shaped with a pot base portion, fastened to the second axial end portion and extending radially to the motor shaft, and a circular cylinder wall portion directly adjoining the outer periphery of the pot base portion and coaxially surrounding the motor shaft. The pot base portion and the circular cylinder wall portion have an at least approximately identical or exactly identical wall thickness. There is also described a wet-rotor pump and a household appliance with such an electric drive motor.

19 Claims, 6 Drawing Sheets

(51) Int. Cl.
*H02K 1/278* (2022.01)
*H02K 1/28* (2006.01)
*H02K 5/12* (2006.01)
*H02K 5/167* (2006.01)
*H02K 21/14* (2006.01)

(52) U.S. Cl.
CPC ............... *H02K 1/278* (2013.01); *H02K 1/28* (2013.01); *H02K 5/12* (2013.01); *H02K 5/167* (2013.01); *H02K 21/14* (2013.01)

(58) Field of Classification Search
CPC ...... H02K 1/2781; H02K 1/2783; H02K 5/10; H02K 5/12; H02K 5/128; H02K 5/1285; H02K 1/28; H02K 15/03; H02K 15/13; H02K 1/2733; H02K 1/30; H02K 5/167; H02K 5/1675; H02K 21/14; F01P 5/12; F01P 2005/125
USPC .......................................... 310/156.01, 156.26
See application file for complete search history.

(56) References Cited

U.S. PATENT DOCUMENTS

| | | | | |
|---|---|---|---|---|
| 2007/0069841 A1* | 3/2007 | Kusano | ................... | H02K 5/128 335/202 |
| 2011/0027112 A1* | 2/2011 | Negishi | ................ | H02K 5/1282 417/423.12 |
| 2012/0313463 A1* | 12/2012 | Howell | ................... | H02K 1/278 264/261 |
| 2013/0266462 A1* | 10/2013 | Bernreuther | ............ | F04D 13/06 417/420 |
| 2014/0271279 A1 | 9/2014 | Kuba | | |
| 2016/0025095 A1* | 1/2016 | Hattori | .................... | F04D 13/06 417/423.12 |
| 2016/0123328 A1* | 5/2016 | Drechsel | .............. | H02K 49/106 72/347 |
| 2016/0341203 A1* | 11/2016 | Parsons | ................. | F04D 29/185 |
| 2016/0365768 A1* | 12/2016 | Popov | ................. | F04D 13/0633 |
| 2017/0045089 A1* | 2/2017 | Rink | ..................... | F16C 41/004 |
| 2017/0122323 A1* | 5/2017 | Fiat | ..................... | F04D 13/0606 |
| 2017/0191481 A1* | 7/2017 | Shafer | ................... | F04D 13/027 |
| 2019/0309754 A1* | 10/2019 | Lee | ........................ | F04D 29/046 |
| 2021/0135519 A1* | 5/2021 | Masera | ................... | H02K 1/278 |

FOREIGN PATENT DOCUMENTS

| | | | |
|---|---|---|---|
| CN | 104052178 A | 9/2014 | |
| CN | 205377486 U | 7/2016 | |
| CN | 206397719 U | 8/2017 | |
| EP | 2908407 A2 * | 8/2015 | ............. H02K 1/278 |
| JP | H1113682 A | 1/1999 | |
| JP | 2012120395 A | 6/2012 | |

* cited by examiner

ELECTRIC DRIVE MOTOR, WET-ROTOR PUMP, AND HOUSEHOLD APPLIANCE

BACKGROUND OF THE INVENTION

Field of the Invention

The invention relates to an electric drive motor, in particular for a pump having an impeller, comprising a permanent magnet rotor which has a motor shaft on which a permanent magnet carrier of the permanent magnet rotor is fastened, wherein a first axial end portion of the motor shaft has a seat for an impeller and the permanent magnet carrier carries at least one permanent magnet and is fastened to a second axial end portion of the motor shaft opposite the first end portion of the motor shaft, and the motor shaft is rotatably mounted by means of a bearing. The invention also relates to a wet-rotor pump and a household appliance comprising such an electric drive motor.

EP 2 908 407 A2 discloses an electric drive motor for a pump having an electrically actuatable stator winding and a rotor, which is mounted so as to be rotatably drivable in the field of the stator winding, leaving an annular gap, and which has a motor shaft, a magnet carrier located on the motor shaft and a plurality of permanent magnets, which are arranged in a distributed manner about at least one casing surface of the magnet carrier, which have in each case at least one outer surface and which are fastened to the magnet carrier by means of a plastic body produced by overmolding the magnet carrier, wherein the permanent magnets are positively and/or non-positively connected on their outer surfaces facing the annular gap by the plastic body such that at least a portion of these outer surfaces is exposed.

SUMMARY OF THE INVENTION

It is the object of the invention to provide an electric drive motor, in particular for a wet-rotor pump, in particular of a household appliance comprising an electric drive motor, in particular a brushless DC motor, the permanent magnet rotor thereof being improved.

The object of the invention is achieved by an electric drive motor, in particular for a pump having an impeller, comprising a permanent magnet rotor which has a motor shaft on which a permanent magnet carrier of the permanent magnet rotor is fastened, wherein a first axial end portion of the motor shaft has a seat for an impeller and the permanent magnet carrier carries at least one permanent magnet and is fastened to a second axial end portion of the motor shaft opposite the first end portion of the motor shaft, and the motor shaft is rotatably mounted by means of a bearing, wherein the permanent magnet carrier is pot-shaped and has a pot base portion fastened to the second axial end portion of the motor shaft and extending at least substantially radially to the motor shaft, and a circular cylinder wall portion directly adjoining the outer periphery of the pot base position and coaxially surrounding the motor shaft, wherein the pot base portion and the circular cylinder wall portion have an at least approximately identical or exactly identical wall thickness.

A wet-rotor pump may be understood within the context of the invention, in particular, as a pump unit which in addition to an impeller and a pump housing also comprises an electric drive motor, in particular a brushless DC motor, the permanent magnet rotor thereof rotating in the liquid conveying medium. The conveying medium in this case is the liquid conveyed by the impeller of the wet-rotor pump. For example, in the case of a dishwasher as the household appliance, the conveying medium may be the so-called washing liquor. For example, in the case of a washing machine as the household appliance, the conveying medium may be the so-called washing lye. Accordingly, in the case of the wet-rotor pump the permanent magnet rotor which rotates in the conveying medium is separated in a fluid-tight manner from the stator of the electric drive motor by means of the pump chamber wall. In this regard the stator is located in a dry area of the wet-rotor pump, i.e. hydraulically separated from the wet chamber in which the permanent magnet rotor rotates.

The stator has a predetermined number of pole shoes, i.e. stator poles. The stator may have, for example, nine pole shoes. The permanent magnet rotor has an assigned number of permanent magnet rotor poles. The number of rotor poles does not have to be identical to the number of stator poles. In the case of nine stator poles, for example, six rotor poles may be provided on the permanent magnet rotor. Irrespective of the number of rotor poles, the permanent magnet rotor may have a single individual permanent magnet, or two, three or more thereof. Each individual permanent magnet in this case may form a single rotor pole. Alternatively, each individual permanent magnet may have a plurality of rotor poles, for example two or three thereof. In a further development, the permanent magnet rotor may merely have a single individual permanent magnet in the form of an annular permanent magnet, wherein this single annular permanent magnet has a number of rotor poles adapted to the stator.

Since the permanent magnet carrier is pot-shaped and has a pot base portion fastened to the second axial end portion of the motor shaft and extending at least substantially radially to the motor shaft, and a circular cylinder wall portion directly adjoining the outer periphery of the pot base portion and coaxially surrounding the motor shaft, wherein the pot base portion and the circular cylinder wall portion have an at least approximately identical or exactly identical wall thickness, a particularly short permanent magnet carrier may be produced which permits a particularly compact and, as a result, stable construction of the electric drive motor and thus a particularly compact and, as a result, stable construction of the entire wet-rotor pump, which in particular improves the smooth operation of the electric drive motor and also of the entire wet-rotor pump. Due to the very short design of the permanent magnet carrier, the permanent magnet rotor may be balanced in a particularly accurate manner and it is possible that potential slight imbalances may not have a very significant effect. Overall, therefore, the constructional height of the electric drive motor and/or the wet-rotor pump may be kept very small so that only a small constructional space is required for the electric drive motor.

The feature according to which the pot base portion and the circular cylinder wall portion have an at least approximately identical or exactly identical wall thickness, means primarily that over its axial extent the circular cylinder wall portion has a diameter which is at least substantially uniform or exactly uniform and the pot base portion is configured to be at least substantially planar and only has slightly shaped portions, for example, for optional overflow channels and/or abutment surfaces for forming an axial bearing seat.

The feature according to which the pot base portion and the circular cylinder wall portion have an at least approximately identical or exactly identical wall thickness also means that in the ideal case the wall thickness is uniform over the entire circular cylinder wall portion and/or in the ideal case the wall thickness of the pot base portion is uniform over its entire surface area. This is the case, in particular, for example when the pot base portion and the circular cylinder wall portion are produced as an integral component by being deep-drawn or deep-pressed from a flat metal plate of uniform plate thickness.

However, in each case the pot base portion and the circular cylinder wall portion may have slightly different wall thicknesses without the effects and advantages according to the invention being lost. Thus, for example, a difference in the wall thicknesses on the pot base portion and on the circular cylinder wall portion may amount to a double wall thickness. If the wall thickness of the pot base portion, however, exceeds more than three times the wall thickness of the circular cylinder wall portion, according to the invention it has to be assumed therefrom that the permanent magnet carrier then has an axial width in which the advantages of a permanent magnet rotor of a particularly short construction are no longer provided.

At least the circular cylinder wall portion of the permanent magnet carrier, or the entire permanent magnet carrier comprising the pot base portion and the circular cylinder wall portion, may be produced from ferromagnetic material.

In this case, it is of particular relevance if at least the circular cylinder wall portion of the permanent magnet carrier is produced from ferromagnetic material since in such a case the circular cylinder wall portion may form a magnetic return iron element for the permanent magnets.

The circular cylinder wall portion of the permanent magnet carrier, or the pot base portion of the permanent magnet carrier, or the entire permanent magnet carrier comprising the pot base portion and the circular cylinder wall portion, may accordingly be produced from stainless steel, in particular magnetic stainless steel, a soft magnetic composite material, a sintered magnetic material and/or a soft magnetic plastic compound.

In this regard, the integral permanent magnet carrier may be produced from a composite material and/or compound material such that a mixture may be made, for example, from a plastic material and a soft magnetic metal powder or granulate. The plastic material may be an, in particular, homogenous thermoplastic material and the soft magnetic metal powder or granulate may be added to the thermoplastic material and, in particular, provided as a master batch, wherein the permanent magnet carrier which is made from such a master batch may be produced, for example, in a plastic injection-molding method.

For example, therefore, the magnetic stainless steel may be a ferritic chromium steel. The ferritic chromium steel may, in particular, be a chromium steel of the type X6Cr17 (AISI 430).

The at least one permanent magnet may be fastened to an outer peripheral casing wall of the circular cylinder wall portion of the permanent magnet carrier by means of an adhesively bonded connection.

In this case, an adhesively bonded connection is characterized, in particular, in that an adhesive layer is incorporated between the one outer peripheral casing wall of the circular cylinder wall portion of the permanent magnet carrier and the magnet wall or magnet walls of the at least one permanent magnet facing the outer peripheral casing wall, said adhesive layer connecting the magnet wall or magnet walls of the at least one permanent magnet to the outer peripheral casing wall of the circular cylinder wall portion of the permanent magnet carrier.

The permanent magnet rotor may have a plurality of individual permanent magnets, in particular circular arc-shaped permanent magnets, which are arranged so as to be distributed uniformly over a periphery and which are fastened to the outer peripheral casing wall of the circular cylinder wall portion of the permanent magnet carrier by means of an adhesively bonded connection.

The individual permanent magnets, in particular circular arc-shaped permanent magnets, may in this case be magnetized, in particular, in the radial directions, i.e. the magnetic field lines of the individual permanent magnets, in particular the circular arc-shaped permanent magnets, run in a concentrated manner, preferably in radial directions.

The permanent magnet rotor may have a single annular permanent magnet which comprises a plurality of magnetic pole pairs and which is fastened to the outer peripheral casing wall of the circular cylinder wall portion of the permanent magnet carrier by means of an adhesively bonded connection.

The at least one permanent magnet may be fastened to the outer peripheral casing wall of the circular cylinder wall portion of the permanent magnet carrier by means of an adhesively bonded connection which comprises a magnetically conductive adhesive.

The magnetically conductive adhesive may be formed, for example, from an adhesive material in which magnetically conductive, in particular soft iron magnetic, powder or granulate is distributed. For example, it is possible to use an adhesive which is enriched in the known manner with a powder of silver and which is conventionally used as an electrically conductive adhesive mass.

The circular cylinder wall portion of the permanent magnet carrier may have an inner casing wall which coaxially surrounds the motor shaft and defines a hollow space between the permanent magnet carrier and the motor shaft, a bearing bush of the bearing extending into said hollow space.

Accordingly, the circular cylinder wall portion of the permanent magnet carrier may surround the bearing at least partially, preferably substantially, or in particular entirely, from the outside. The circular cylinder wall portion of the permanent magnet carrier in this case may have a circular cylinder inner casing wall which defines the hollow space in which the bearing is at least partially, preferably substantially, or in particular entirely, located. The pot base portion may have an approximately circular disk-shaped basic shape such that, on the one hand, the pot base portion is fastened in its center to the second axial end portion of the motor shaft and, on the other hand, on its outer peripheral region has the adjoining circular cylinder wall portion of the permanent magnet carrier.

The pot base portion of the permanent magnet carrier may have an inner base wall which forms an axial bearing surface which directly abuts against an end wall of the bearing bush of the bearing for axially supporting the motor shaft. To this end, the inner base wall of the pot base portion may be slightly shaped and/or surface-treated. The inner base wall of the pot base portion may be adapted, i.e. adjusted in its size, shape and/or surface characteristics, to the surface of the end wall of the bearing bush, in particular in order to ensure a substantially frictionless rotation of the motor shaft since the pot base portion of the permanent magnet carrier bears against the bearing bush.

The pump chamber wall may be pot-shaped and have a pump chamber wall-pot base, and the pump chamber wall-pot base in this case may have an abutment surface which faces the front face of the second axial end portion of the motor shaft and which is configured for supporting the motor shaft in a direction opposing the bearing direction of the axial bearing of the bearing.

In this regard, the abutment surface acts in an opposing axial direction from the axial bearing of the wet-rotor pump.

The pot base portion of the permanent magnet carrier may be connected to the motor shaft by means of a press-fit connecting seat or a welded connection. As a result, the motor shaft is connected to the permanent magnet carrier fixedly in terms of rotation.

At least one radially extending channel may be arranged on the inner base wall of the pot base portion of the permanent magnet carrier, and the pot base portion may in this case have a hub in which the motor shaft is received, wherein at least one groove is incorporated on the hub inner wall of the hub, said groove being connected to the at least one channel in terms of flow technology to form a liquid overflow channel, such that a liquid which is located, for example, in a wet chamber of a wet-rotor pump, which has the electric drive motor, may overflow between the one axial side of the permanent magnet carrier and the other axial side of the permanent magnet carrier.

Each channel may be formed by a recessed shaped portion or milled portion in the base wall of the pot base portion of the permanent magnet carrier. Each channel may extend radially outwardly, in particular starting from the hub of the permanent magnet carrier in a radial direction. In each case, the at least one groove on the hub inner wall of the hub may be formed by a flute or notch which is recessed in the axial direction in the hub inner wall of the hub and which extends over the entire thickness of the hub, i.e. the entire thickness of the pot base portion of the permanent magnet carrier. The at least one groove transitions into the at least one channel such that the groove and the channel are connected together in terms of flow technology. With a plurality of channels and grooves, in each case just one groove may be assigned to a single channel.

The pot base portion of the permanent magnet carrier may be produced together with the circular cylinder wall portion of the permanent magnet carrier as an integral component, by machining, by sintering, by casting, by deep-drawing and/or deep-pressing.

The pot base portion of the permanent magnet carrier may be produced together with the circular cylinder wall portion of the permanent magnet carrier as an integral component, by the circular cylinder wall portion being formed from a tubular portion of a first semi-finished product and the pot base portion being formed from a stamped circular disk of a substantially plate-shaped second semi-finished product, and the tubular portion being connected to the circular disk by welding or soldering to the integral component.

The motor shaft may generally be rotatably mounted by means of a bearing inside the wet chamber, said bearing carrying the motor shaft on an intermediate portion of the motor shaft arranged axially between the first end portion of the motor shaft and the second end portion of the motor shaft. This means, in particular, that the bearing arranged in the intermediate portion of the motor shaft is the single bearing which rotatably mounts the motor shaft inside the wet chamber. Accordingly, the motor shaft is exclusively rotatably guided and rotatably mounted relative to the pump housing by this single bearing which carries the motor shaft on its intermediate portion. In this respect, the permanent magnet rotor is only mounted on one side.

The bearing may comprise a single radial plain bearing which is configured to mount the intermediate portion of the motor shaft in a rotatable manner and which has a single axial bearing which is configured to support the motor shaft in a single axial direction.

By means of the radial plain bearing, the motor shaft is fixed in an exact coaxial position relative to the pump chamber wall and the stator. To this end, the bearing fully encompasses the intermediate portion of the motor shaft. Due to the function of the impeller, during the rotation of the impeller and thus during the rotation of the motor shaft an axial force is introduced by the impeller, which is arranged in the conveying medium inside the wet chamber, in an axial direction onto the motor shaft. This axial force in an axial direction is taken up by the axial bearing.

The bearing may have a bearing shield which is fixedly connected to the pump chamber wall and which carries a bearing seat on which a bearing bush is configured, said bearing bush comprising a hub in which the intermediate portion of the motor shaft is rotatably mounted.

The bearing shield may be configured as a separate component from the pump chamber wall and/or from the pump housing, wherein the bearing shield may be inserted, in particular pressed, into a circular cylinder inner seat. In this regard, the bearing shield may be fixedly connected as a separate component to the pump chamber wall.

The bearing seat may be formed by a circular cylinder and/or pot-shaped receiver into which the bearing bush, which is configured in particular separately, is inserted. Alternatively, the bearing bush may optionally also be configured integrally with the bearing seat and/or the bearing shield. The bearing bush in this case comprises the hub or, in other words, the hub may be formed by the bearing bush. The motor shaft runs in the bearing bush and/or the hub and namely is mounted on its intermediate portion in the hub.

The wet-rotor pump may have a pump housing, the pump chamber wall and the bearing shield being rigidly fastened thereto, wherein the pump chamber wall has a circular cylinder casing wall and the bearing seat is arranged concentrically to the circular cylinder casing wall of the pump chamber wall inside the wet chamber.

The pump housing or a housing part of a multipart pump housing may have the pump chamber wall. This may mean that the pump chamber wall is fastened as a separate component to the pump housing or the housing part. Alternatively, this may mean that the pump chamber wall is configured integrally with the pump housing or with the housing part. In the region of the stator and the permanent magnet rotor, the wall thickness of the pump chamber wall may be designed to be particularly small. In this case, the pump chamber wall extends through the annular gap which separates the stator from the permanent magnet rotor and in which the magnetic field of the electric drive motor acts according to its function.

The bearing seat of the bearing shield may have a circular cylinder inner wall and the bearing bush in this case may have a circular cylinder outer casing wall which corresponds to the circular cylinder inner wall of the bearing shield and which is configured such that the bearing bush is inserted with a precise fit into the bearing seat.

The bearing shield may form an intermediate wall which separates a first partial space of the wet chamber, in which the permanent magnet carrier is arranged, from a second partial space of the wet chamber, in which the impeller is arranged. In this regard, the conveying medium flows both through the first partial space and the second partial space. To this end, the bearing shield may have corresponding overflow openings via which conveying medium is able to pass out of the first partial space into the second partial space. In a similar manner, the bearing shield may have corresponding overflow openings via which conveying medium is able to pass out of the second partial space into the first partial space.

The object is also achieved by a wet-rotor pump having a pump chamber wall which defines a wet chamber of the wet-rotor pump, an impeller which is rotatably mounted in the wet chamber and an electric drive motor which drives the impeller, as is described according to one or more embodiments.

The object is also achieved by a household appliance, in particular a dishwasher, washing machine, dryer or extractor hood, comprising a wet-rotor pump according to one embodiment or according to any combination of a plurality of embodiments, as described above.

Practical exemplary embodiments of an electric drive motor according to the invention are described in more detail in the following description with reference to the accompanying figures using the example of a wet-rotor pump which has such an electric drive motor. Specific individual features of these exemplary embodiments may represent general features of the invention irrespective of the actual context in which they are mentioned, optionally even individually or in different combinations from those shown.

DETAILED DESCRIPTION OF THE INVENTION

FIG. 1 to FIG. 6 show components of two exemplary embodiments of a wet-rotor pump 1 of an exemplary household appliance, for example a dishwasher. The wet-rotor pump 1 comprises a pump housing 2 and an electric drive motor 3.

Figure 1:
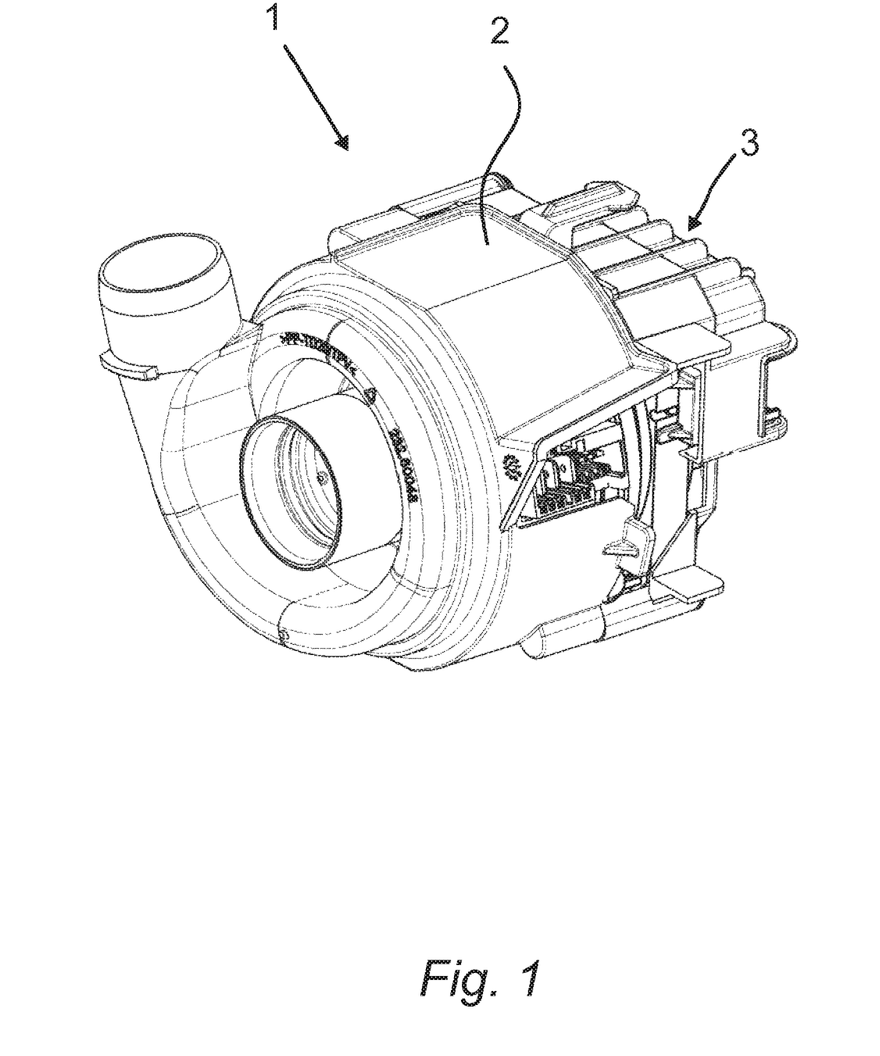
FIG. 1 shows a perspective view of an exemplary wet-rotor pump of a household appliance in the manner of a dishwasher which has an impeller and an electric drive motor.
Figure 2:
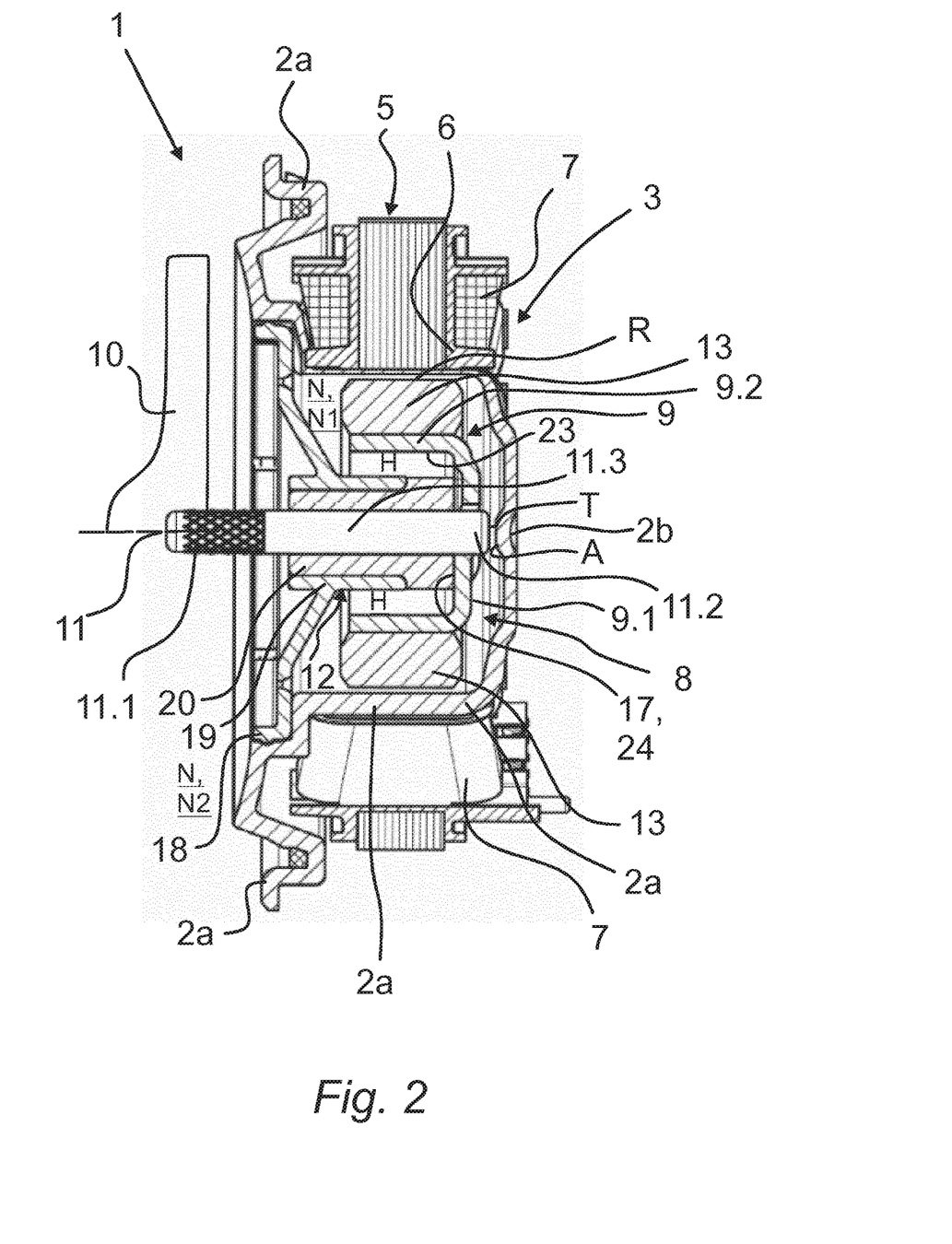
FIG. 2 shows a sectional view of a wet-rotor pump according to the invention with an electric drive motor.

As is shown in FIG. 2, in particular, the wet-rotor pump 1 has a pump chamber wall 2a which defines a wet chamber N of the wet-rotor pump 1, an impeller 10 which is rotatably mounted in the wet chamber N, and an electric drive motor 3 which drives the impeller 10 and which has a stator 5 with pole shoes 6 arranged outside the wet chamber N and at least one electrically actuatable stator winding 7, and which has a permanent magnet rotor 8 mounted in a rotatably drivable manner inside the wet chamber N in the field of the stator winding 7 leaving an annular gap R.

The permanent magnet rotor 8 comprises a motor shaft 11 on which both a permanent magnet carrier 9 of the permanent magnet rotor 8 and the impeller 10 are fastened, wherein the impeller 10 is fastened to a first axial end portion 11.1 of the motor shaft 11 and the permanent magnet carrier 9 is fastened to a second axial end portion 11.2 of the motor shaft 11 opposite the first end portion 11.1 of the motor shaft 11.

The motor shaft 11 is rotatably mounted by means of a bearing 12 inside the wet chamber N, which bearing 12 carries the motor shaft 11 on an intermediate portion 11.3 of the motor shaft 11 arranged axially between the first end portion 11.1 of the motor shaft 11 and the second end portion 11.2 of the motor shaft 11.

In the case of the present exemplary embodiment, a bearing seat 19 of a bearing shield 18 has a circular cylinder inner wall and a bearing bush 20 has a circular cylinder outer casing wall which corresponds to the circular cylinder inner wall of the bearing shield 18 and which is configured as shown such that the bearing bush 20 is inserted with a precise fit into the bearing seat 19.

The bearing shield 18 forms an intermediate wall which separates a first partial space N1 of the wet chamber N in which the permanent magnet carrier 8 is arranged, from a second partial space N2 of the wet chamber N in which the impeller 10 is arranged.

The permanent magnet carrier 9 is of pot-shaped configuration such that the permanent magnet carrier 9 has a pot base portion 9.1 via which the permanent magnet carrier 9 is fastened to the second axial end portion of the motor shaft 11 and the permanent magnet carrier 9 has a circular cylinder wall portion 9.2 which adjoins the pot base portion 9.1, which coaxially surrounds the motor shaft 11 and which defines a hollow space H of the permanent magnet carrier 9, the bearing 12 extending into said hollow space H.

The permanent magnet carrier 9 carries the at least one permanent magnet 13 and is fastened to a second axial end portion 11.2 of the motor shaft 11 opposite the first end portion 11.1 of the motor shaft 11. The motor shaft 11 is rotatably mounted by means of the bearing 12 inside the wet chamber N, wherein the permanent magnet carrier 9 is pot-shaped and has a pot base portion 9.1 fastened to the second axial end portion 11.2 of the motor shaft 11 and extending at least substantially radially to the motor shaft 11, and a circular cylinder wall portion 9.2 directly adjoining the outer periphery of the pot base portion 9.1 and coaxially surrounding the motor shaft 11, wherein the pot base portion 9.1 and the circular cylinder wall portion 9.2 have an at least approximately identical or exactly identical wall thickness.

At least the circular cylinder wall portion 9.2 of the permanent magnet carrier 9, or the entire permanent magnet carrier 9 comprising the pot base portion 9.1 and the circular cylinder wall portion 9.2, are produced from ferromagnetic material.

The circular cylinder wall portion 9.2 of the permanent magnet carrier 9, or the pot base portion 9.1 of the permanent magnet carrier 9, or the entire permanent magnet carrier 9 comprising the pot base portion 9.1 and the circular cylinder wall portion 9.2, may be produced from stainless steel, in particular magnetic stainless steel, a soft magnetic composite material, a sintered magnetic material and/or a soft magnetic plastic compound.

The at least one permanent magnet 13 is fastened to an outer peripheral casing wall of the circular cylinder wall portion 9.2 of the permanent magnet carrier 9 by means of an adhesively bonded connection.

Figure 3:
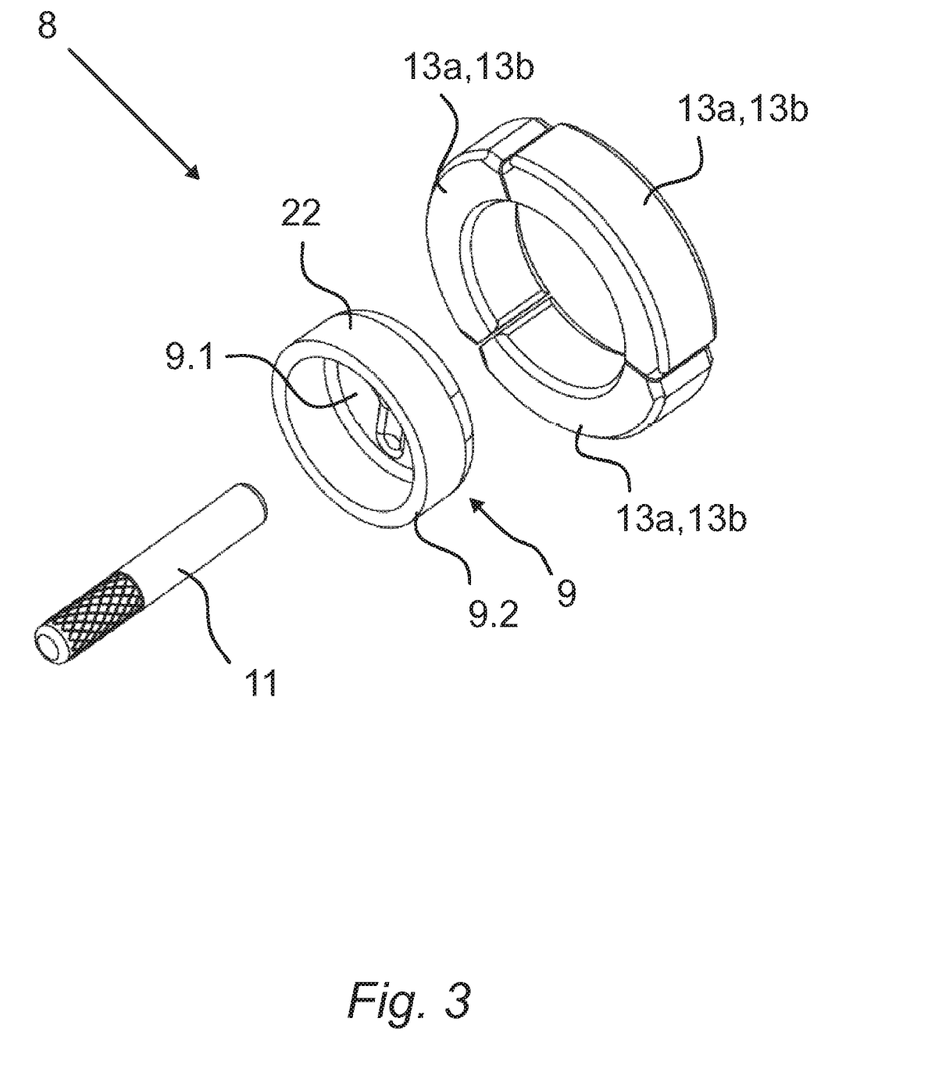
FIG. 3 shows an exploded view of a first exemplary embodiment of a permanent magnet rotor according to the invention of the electric drive motor according to FIG. 2.

According to the embodiment according to FIG. 3, the permanent magnet rotor 8 has a plurality of individual permanent magnets 13a which are arranged so as to be distributed uniformly over a periphery, in particular circular arc-shaped permanent magnets 13b which are fastened to the outer peripheral casing wall 22 of the circular cylinder wall portion 9.2 of the permanent magnet carrier 9 by means of an adhesively bonded connection.

Figure 4:
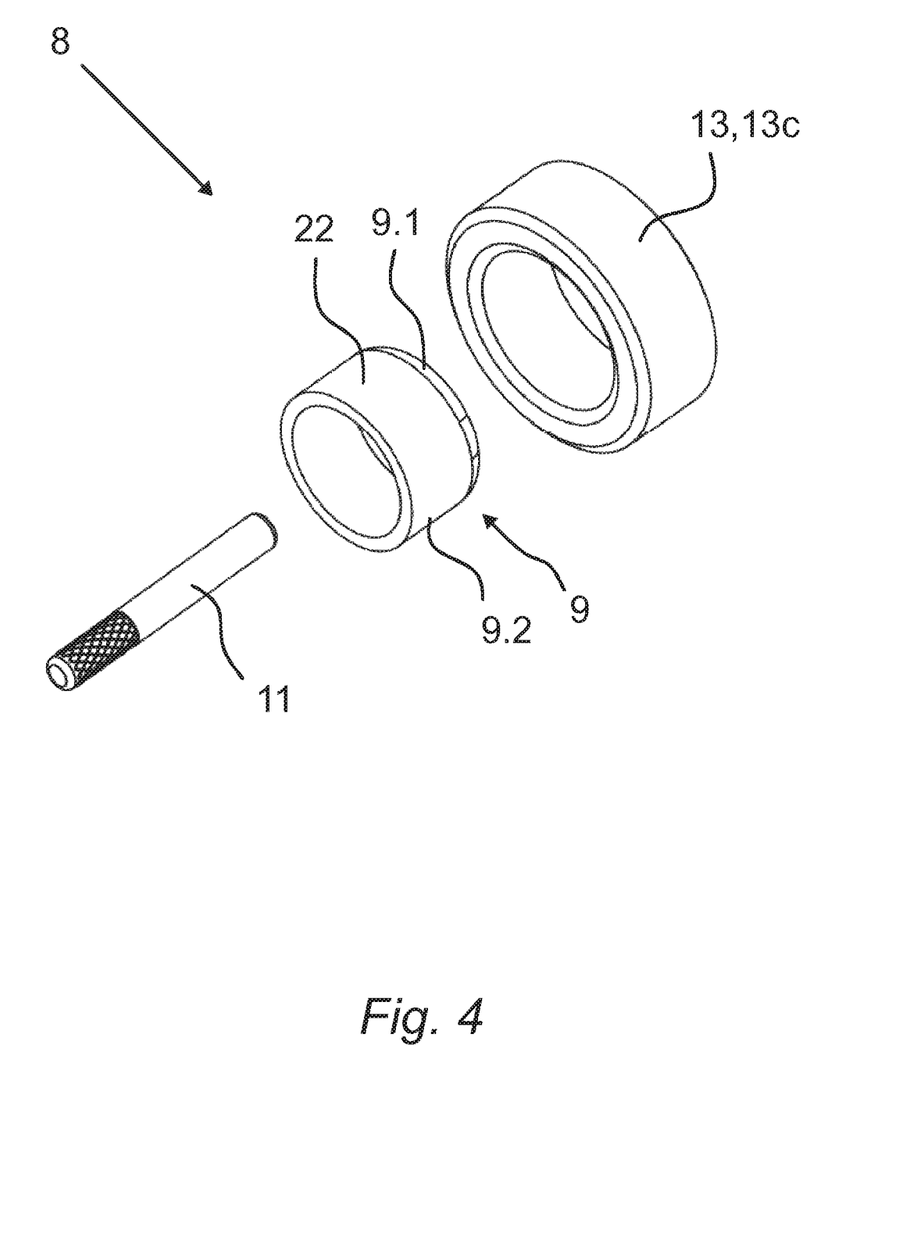
FIG. 4 shows an exploded view of a second exemplary embodiment of a permanent magnet rotor according to the invention of the electric drive motor according to FIG. 2.

According to an alternative embodiment according to FIG. 4, the permanent magnet rotor 8 has a single annular permanent magnet 13c which comprises a plurality of magnetic pole pairs and which is fastened to the outer peripheral casing wall 22 of the circular cylinder wall portion 9.2 of the permanent magnet carrier 9 by means of an adhesively bonded connection.

The at least one permanent magnet 13 is accordingly fastened to the outer peripheral casing wall 22 of the circular cylinder wall portion 9.2 of the permanent magnet carrier 9 by means of an adhesively bonded connection which, in particular, has a magnetically conductive adhesive.

Returning to FIG. 2 it is shown that the circular cylinder wall portion 9.2 of the permanent magnet carrier 9 has an inner casing wall 23 which coaxially surrounds the motor shaft 11 and defines a hollow space H between the permanent magnet carrier 9 and the motor shaft 11, the bearing bush 20 of the bearing 12 extending into said hollow space H.

The pot base portion 9.1 of the permanent magnet carrier 9 also has an inner base wall 24 which forms an axial bearing surface which directly abuts against an end wall of the bearing bush 20 of the bearing 12 for axially supporting the motor shaft 11. Moreover, the pump chamber wall 2a is also configured to be pot-shaped with a pump chamber wall-pot base 2b, wherein the pump chamber wall-pot base 2b has an abutment surface A which faces the front face T of the second axial end portion 11.2 of the motor shaft 11 and which is configured for supporting the motor shaft 11 in a direction opposing the bearing direction of the axial bearing 17 and/or the axial bearing surface of the inner base wall 24.

The pot base portion 9.1 of the permanent magnet carrier 9 is connected to the motor shaft 11 by means of a press-fit connecting seat or a welded connection.

Figure 5:
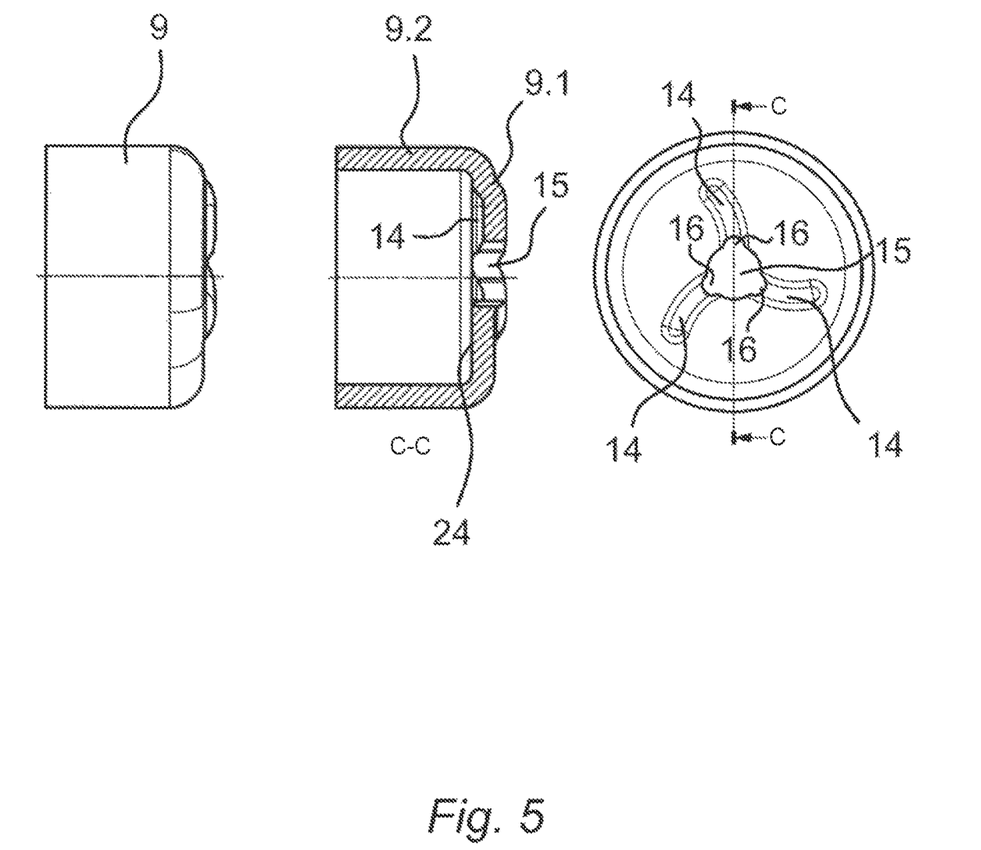
FIG. 5 shows a side view, a sectional view from the line C-C, and an axial plan view of the permanent magnet carrier of the electric drive motor according to FIG. 2.
Figure 6:
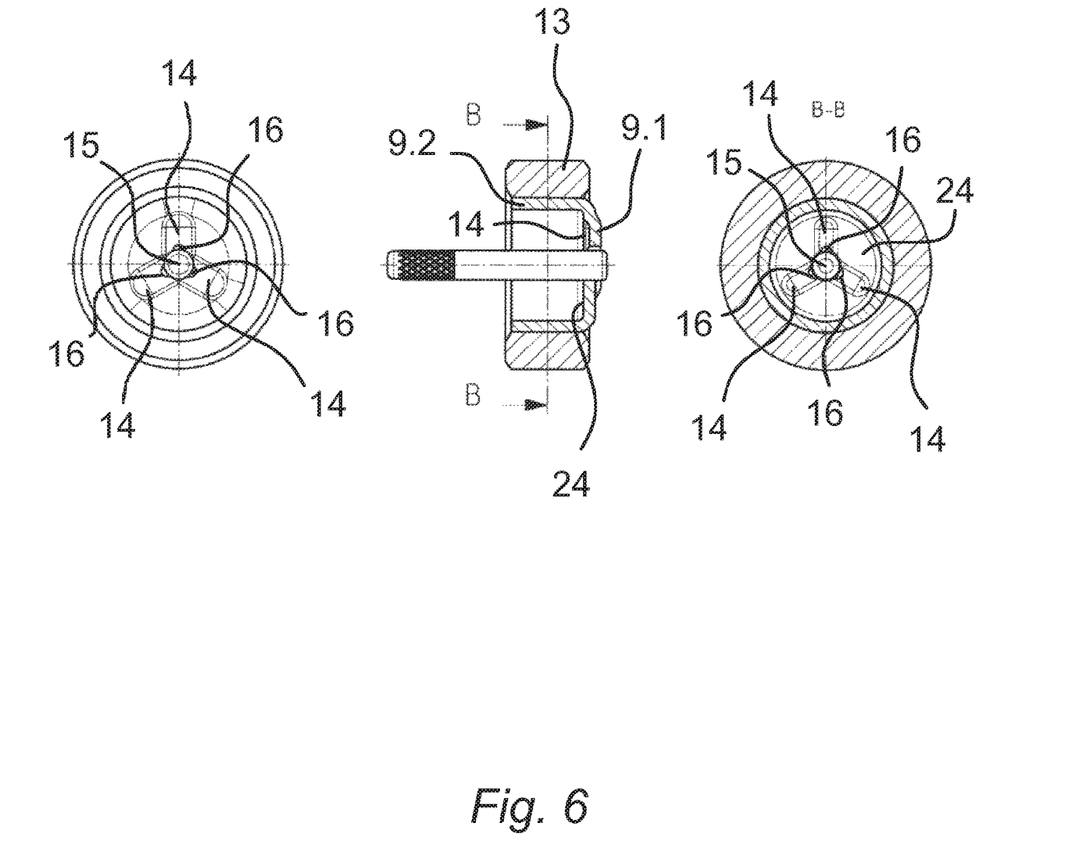
FIG. 6 shows an axial plan view, a longitudinal sectional view and a cross sectional view from the line B-B of an exemplary assembly of the motor shaft, permanent magnet carrier and permanent magnet.

As is visible in particular in FIG. 5 and FIG. 6, in the case of the exemplary embodiment shown, three radially extending channels 14 are arranged on the inner base wall 24 of the pot base portion 9.1 of the permanent magnet carrier 9, and the pot base portion 9.1 has a hub 15 in which the motor shaft 11 is received, wherein in the case of the exemplary embodiment shown three grooves 16 are incorporated on the hub inner wall of the hub 15, said grooves being connected to the channels 14 in terms of flow technology to form liquid overflow channels, such that the liquid which is located in the wet chamber N may overflow between the one axial side of the permanent magnet carrier 9 and the other axial side of the permanent magnet carrier 9.

In FIG. 6 the channels 14 are oriented such that they extend outwardly in radial directions from the hub 15. The channels 14 in this case are configured to run in a linear manner. In contrast to FIG. 6, however, the channels 14 according to FIG. 5 are oriented such that they extend outwardly away from the hub 15. However, the channels 14 in the case of the embodiment according to FIG. 5 are not configured to run in a linear manner but are configured to run in a curved manner. According to FIG. 5 the curved path of the channels 14 may be such that in plan view, as shown to the left in FIG. 5, the channels extend in this plane which is located perpendicular to the rotational axis, as shown, and in this plane describe a curve or an arc. An arcuate path of the channels 14 may contribute to a reduction in noise during the rotation of the permanent magnet rotor 8.

The pot base portion 9.1 of the permanent magnet carrier 9 is produced, as shown, together with the circular cylinder wall portion 9.2 of the permanent magnet carrier 9 as an integral component, for example by machining, by sintering, by casting, by deep-drawing and/or deep-pressing.

The pot base portion 9.1 of the permanent magnet carrier 9, however, may also be produced together with the circular cylinder wall portion 9.2 of the permanent magnet carrier 9 as an integral component, by the circular cylinder wall portion 9.2 being formed from a tubular portion of a first semi-finished product and the pot base portion 9.1 being formed from a stamped circular disk of a substantially plate-shaped second semi-finished product, and the tubular portion being connected to the circular disk by welding or soldering to form the integral component.

LIST OF REFERENCE CHARACTERS

1 Wet-rotor pump
2 Pump housing
2a Pump chamber wall
2b Pump chamber wall-pot base
3 Electric drive motor
5 Stator
6 Pole shoe
7 Stator winding
8 Permanent magnet rotor
Permanent magnet carrier
9.1 Pot base portion
9.2 Circular cylinder wall portion
10 Impeller
11 Motor shaft
11.1 First axial end portion
11.2 Second axial end portion
11.3 Intermediate portion
12 Bearing
13 Permanent magnet
13a Individual permanent magnets
13b Circular arc-shaped permanent magnets
13c Annular permanent magnet
14 Channels
15 Hub
16 Grooves
17 Axial bearing
18 Bearing shield
19 Bearing seat
20 Bearing bush
22 Outer peripheral casing wall
23 Inner casing wall
24 Inner base wall
A Abutment surface
H Hollow space
N Wet chamber
N1 First partial space
N2 Second partial space
R Annular gap
T Front face

The invention claimed is:
1. An electric drive motor, comprising:
a permanent magnet rotor having a motor shaft rotatably mounted by a bearing, and a permanent magnet carrier of said permanent magnet rotor fastened on said motor shaft;
said motor shaft having a first axial end portion with a seat for an impeller and a second axial end portion opposite said first axial end portion;

said permanent magnet carrier carrying at least one permanent magnet and being fastened to said second axial end portion of said motor shaft;

said permanent magnet carrier being pot-shaped with a pot base portion fastened to said second axial end portion and extending radially from said motor shaft to a circular cylinder wall portion, and with the circular cylinder wall portion directly adjoining an outer periphery of said pot base portion and coaxially surrounding said motor shaft, wherein a deviation of a wall thickness on the pot base portion and the circular cylinder wall portion amounts to up to twice a wall thickness or said pot base portion and said circular cylinder wall portion have an identical wall thickness;

an inner base wall of said pot base portion being planar, being orthogonal to the axial extension of said motor shaft, and facing said first axial end portion;

said inner base wall being formed with at least one radially extending channel, and said pot base portion having a hub in which said motor shaft is received, and at least one groove is formed on a hub inner wall of said hub, said groove being fluidically connected to said at least one channel to form a liquid overflow channel, such that a liquid may overflow between the one axial side of said permanent magnet carrier and the other axial side of said permanent magnet carrier; and said pot base portion of said permanent magnet carrier is produced together with the circular cylinder wall portion of said permanent magnet carrier as an integral component by a process selected from the group consisting of machining, sintering, casting, and deep-pressing.

2. The electric drive motor according to claim 1, wherein at least said circular cylinder wall portion of said permanent magnet carrier, or an entire said permanent magnet carrier including said pot base portion and said circular cylinder wall portion, is formed of ferromagnetic material.

3. The electric drive motor according to claim 1, wherein said circular cylinder wall portion of said permanent magnet carrier, or said pot base portion of said permanent magnet carrier, or an entire said permanent magnet carrier including said pot base portion and said circular cylinder wall portion, is produced from at least one material selected from the group consisting of a stainless steel, a soft magnetic composite material, a sintered magnetic material, and a soft magnetic plastic compound.

4. The electric drive motor according to claim 1, wherein said circular cylinder wall portion of said permanent magnet carrier, or said pot base portion of said permanent magnet carrier, or an entire said permanent magnet carrier including said pot base portion and said circular cylinder wall portion, is produced from magnetic stainless steel.

5. The electric drive motor according to claim 1, wherein the at least one permanent magnet is fastened to an outer peripheral casing wall of said circular cylinder wall portion of said permanent magnet carrier by an adhesively bonded connection.

6. The electric drive motor according to claim 5, wherein said at least one permanent magnet is one of a plurality of individual permanent magnets uniformly distributed over a periphery and fastened to said outer peripheral casing wall of said circular cylinder wall portion of said permanent magnet carrier by the adhesively bonded connection.

7. The electric drive motor according to claim 6, wherein said individual permanent magnets are circular arc-shaped permanent magnets.

8. The electric drive motor according to claim 5, wherein said permanent magnet rotor has a single annular permanent magnet which comprises a plurality of magnetic pole pairs and which is fastened to said outer peripheral casing wall of said circular cylinder wall portion of said permanent magnet carrier by the adhesively bonded connection.

9. The electric drive motor according to claim 5, wherein said at least one permanent magnet is fastened to said outer peripheral casing wall of said circular cylinder wall portion of said permanent magnet carrier by the adhesively bonded connection, which comprises a magnetically conductive adhesive.

10. The electric drive motor according to claim 1, wherein said circular cylinder wall portion of said permanent magnet carrier has an inner casing wall which coaxially surrounds said motor shaft and defines a hollow space between said permanent magnet carrier and said motor shaft, and wherein said bearing has a bearing bush extending into said hollow space.

11. The electric drive motor according to claim 10, wherein said pot base portion of said permanent magnet carrier has an inner base wall which forms an axial bearing surface which directly abuts against an end wall of said bearing bush of said bearing for axially supporting said motor shaft.

12. The electric drive motor according to claim 1, wherein said pot base portion of said permanent magnet carrier is connected to said motor shaft by way of a press-fit connecting seat or a welded connection.

13. The electric drive motor according to claim 1, wherein said pot base portion of said permanent magnet carrier is produced together with the circular cylinder wall portion of said permanent magnet carrier as an integral component, by said circular cylinder wall portion being formed from a tubular portion of a first semi-finished product and said pot base portion being formed from a stamped circular disk of a substantially plate-shaped semi-finished product, and said tubular portion being connected to said circular disk by welding or soldering to form said integral component.

14. The electric drive motor according to claim 1, further comprising an impeller mounted to said seat formed on said first axial end portion of said motor shaft.

15. A wet-rotor pump, comprising:
a pump chamber wall defining a wet chamber of the wet-rotor pump;
an electric drive motor according to claim 1; and
an impeller rotatably mounted in said wet chamber and supported on, and driven by, the motor shaft of said electric drive motor.

16. The wet-rotor pump according to claim 15, wherein said pump chamber wall is pot-shaped and has a pump chamber wall pot base formed with abutment surface that faces a front face of said second axial end portion of said motor shaft and which is configured for supporting said motor shaft in a direction opposing an axial bearing direction of said bearing.

17. A household appliance, comprising a wet-rotor pump according to claim 15.

18. The household appliance according to claim 17 being a dishwasher, a washing machine, a dryer, or an extractor hood.

19. An electric drive motor, comprising:
a permanent magnet rotor having a motor shaft rotatably mounted by a bearing, and a permanent magnet carrier of said permanent magnet rotor fastened on said motor shaft;

said motor shaft having a first axial end portion with a seat for an impeller and a second axial end portion opposite said first axial end portion;

said permanent magnet carrier carrying at least one permanent magnet and being fastened to said second axial end portion of said motor shaft;

said permanent magnet carrier being pot-shaped with a pot base portion fastened to said second axial end portion and extending radially from said motor shaft to a circular cylinder wall portion, and with the circular cylinder wall portion directly adjoining an outer periphery of said pot base portion and coaxially surrounding said motor shaft, wherein a deviation of a wall thickness on the pot base portion and the circular cylinder wall portion amounts to up to twice a wall thickness;

an inner base wall of said pot base portion being planar, being orthogonal to the axial extension of said motor shaft, and facing said first axial end portion;

said inner base wall being formed with at least one radially extending channel, and said pot base portion having a hub in which said motor shaft is received, and at least one groove is formed on a hub inner wall of said hub, said groove being fluidically connected to said at least one channel to form a liquid overflow channel, such that a liquid may overflow between the one axial side of said permanent magnet carrier and the other axial side of said permanent magnet carrier; and said pot base portion of said permanent magnet carrier is produced together with the circular cylinder wall portion of said permanent magnet carrier as an integral component by a process selected from the group consisting of machining, sintering, casting, and deep-pressing.

\* \* \* \* \*